United States Patent [19]

Rockenfeller

[11] Patent Number: 4,461,756

[45] Date of Patent: Jul. 24, 1984

[54] SINGLET DELTA OXYGEN GENERATOR

[75] Inventor: John D. Rockenfeller, Grand Island, N.Y.

[73] Assignee: The United States of America as represented by the Secretary of the Air Force, Washington, D.C.

[21] Appl. No.: 431,436

[22] Filed: Sep. 30, 1982

[51] Int. Cl.$^3$ ............................................. C01B 13/00
[52] U.S. Cl. ..................................... 423/579; 372/89; 422/189; 422/202
[58] Field of Search ........................... 423/579; 372/89

[56] References Cited

U.S. PATENT DOCUMENTS

| | | | |
|---|---|---|---|
| 3,980,762 | 9/1976 | Shiblom, Jr. et al. | 423/579 |
| 4,102,950 | 7/1978 | Pilipovich et al. | 423/579 |
| 4,246,252 | 1/1981 | McDermott et al. | 423/579 |
| 4,318,895 | 3/1982 | Richardson et al. | 423/579 |
| 4,342,116 | 7/1982 | MacKnight et al. | 423/579 |

OTHER PUBLICATIONS

Kearnes, "Physical and Chemical Properties of Singlet Molecular Data on Oxygen", Chem. Rev. II, (1971).
Seliger, "Chemiluminescence of $H_2O$-NaOCl Solutions", J. Ehm. Phys., 40, 3133, (1964).
Pritt et al., "Chemical Generation . . . ", Appl. Phys. Lett., 31, 745, (1979).

Primary Examiner—John Doll
Assistant Examiner—Wayne A. Langel
Attorney, Agent, or Firm—Donald J. Singer; William J. O'Brien

[57] ABSTRACT

A method and apparatus for producing molecular oxygen in the excited singlet delta oxygen electronic state for use as an excited species reactant in a high energy, continuous-wave, chemically pumped laser. In this invention, small amounts of sodium hydroxide and hydrogen peroxide are continuously mixed, reacted, cooled and then combined with chlorine to form a mixture which is injected into a mixing chamber as very fine droplets to provide an efficient means for effecting a reaction which produces excited molecular oxygen.

4 Claims, 3 Drawing Figures

SINGLET DELTA OXYGEN GENERATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to a method and apparatus for generating singlet delta oxygen. In a more particular aspect, this invention relates to a method and apparatus for the generation of oxygen in the excited singlet delta electronic state which in turn can be used in high energy chemical lasers. This type of generation system finds particular utility as a means for producing an electronically excited species for lasing systems which must be compact, portable, safe and subject to exposure to low gravitational fields.

Several practical applications exist in which lasers are used in heating, navigation and communication systems. These devices employ an optically active media from which a laser beam is extracted. The beam is generated by means of a population inversion consisting of an unstable abundance of molecules having excited high energy electronic states which release photons as they decay to the equilbrium lower energy states of the optically active media.

In high energy chemical lasers, the excited electronic states are generated by a chemical reaction. For example, one such reaction involves the use of excited molecular oxygen, hereinafter referred to as $O_2(^1\Delta)$, in combination with an optically active media or lasing substance, such as iodine or fluorine. These lasers have been found to be very useful and the increased interest in their use has spawned a considerable research effort in an attempt at improving their performance characteristics, especially in the area of materials supply. However, a number of problems in the generation, storage and maintenance of the gaseous reactant materials required to produce the necessary population inversion has limited the use of these chemical lasers in military and airborne applications.

One method presently in use for generating a stream of $O_2(^1\Delta)$, involves a chemical reaction between chlorine gas and an alkaline solution of hydrogen peroxide. The excited oxygen so generated, can then be added to a suitable lasing medium and the mixture passed through an optical resonator to bring about a lasing action. Specific details of such a method are disclosed in U.S. Pat. No. 4,246,252, issued Jan. 20, 1981 to McDermott et al.

The prior art method referred to above, however, has several inherent problems which have prompted the study of alternate systems for generating $O_2(^1\Delta)$ in a more efficient manner. One such problem is that as the device is scaled to a larger size, the volume of hydrogen peroxide required becomes quite large. Since hydrogen peroxide is a monopropellant with an explosive TNT equivalent of 0.40, scaling the device to a large size presents a hazard. Another problem which occurs with a bubbler type apparatus is the creation of a variation in the yield of $O_2(^1\Delta)$ as a function of time. A byproduct of the oxidation reaction is HCl. To consume the acid, a base is added to the peroxide. As the base is used, the solution becomes acidic and the production of $O_2(^1\Delta)$ diminishes. Further, the salt produced in the neutralization builds up in solution. Also, the use of a bubbler type apparatus in low level gravitational fields or in areas of high vibration is difficult in that the solution cannot be retained in the reactor.

With the present invention, however, it has been found that the problems associated with the prior art can be overcome by the discovery of a device and method which is capable of producing the desired $O_2(^1\Delta)$ continuously, safely and reproducibly.

SUMMARY OF THE INVENTION

In accordance with this invention, the above and other deficiencies of the prior art have been satisfactorily overcome by the method and apparatus of the present invention. The invention utilizes a minimum amount of the hazardous hydrogen peroxide component in a continuous flow reactor that dissolves the chlorine reactant at high pressure and desorbs the resulting excited oxygen product at low pressure with continuous mixing of the liquid hydrogen peroxide and base in small quantities that are continuously used.

The apparatus of the present invention includes a mixer for the reaction of a base reactant, such as sodium hydroxide, with hydrogen peroxide; a heat exchanger for the removal of the resulting heat from this reaction; an injector for the resulting basic peroxide solution; a swirl chamber into which the chlorine oxidant is injected; and a sonic orifice through which the ultimate reaction mixture is injected into a desorber chamber.

Accordingly, the primary objective of this invention is to provide a method for the generation of an electronically excited molecular chemical medium for use in a chemical laser.

Another object is to provide a device for the generation of molecular oxygen in the singlet delta excited electronic state.

Still another object is to provide a simple, dependable, efficient, economical, and safe method for chemically preparing electronically excited molecular oxygen for use as an energizing medium for a continuous-wave, chemically pumped laser.

The above and still other objects and advantages of this invention will become more readily apparent upon consideration of the following detailed disclosure when considered in conjunction with the accompanying drawings.

DESCRIPTION OF THE PREFERRED EMBODIMENT

Figure 1:
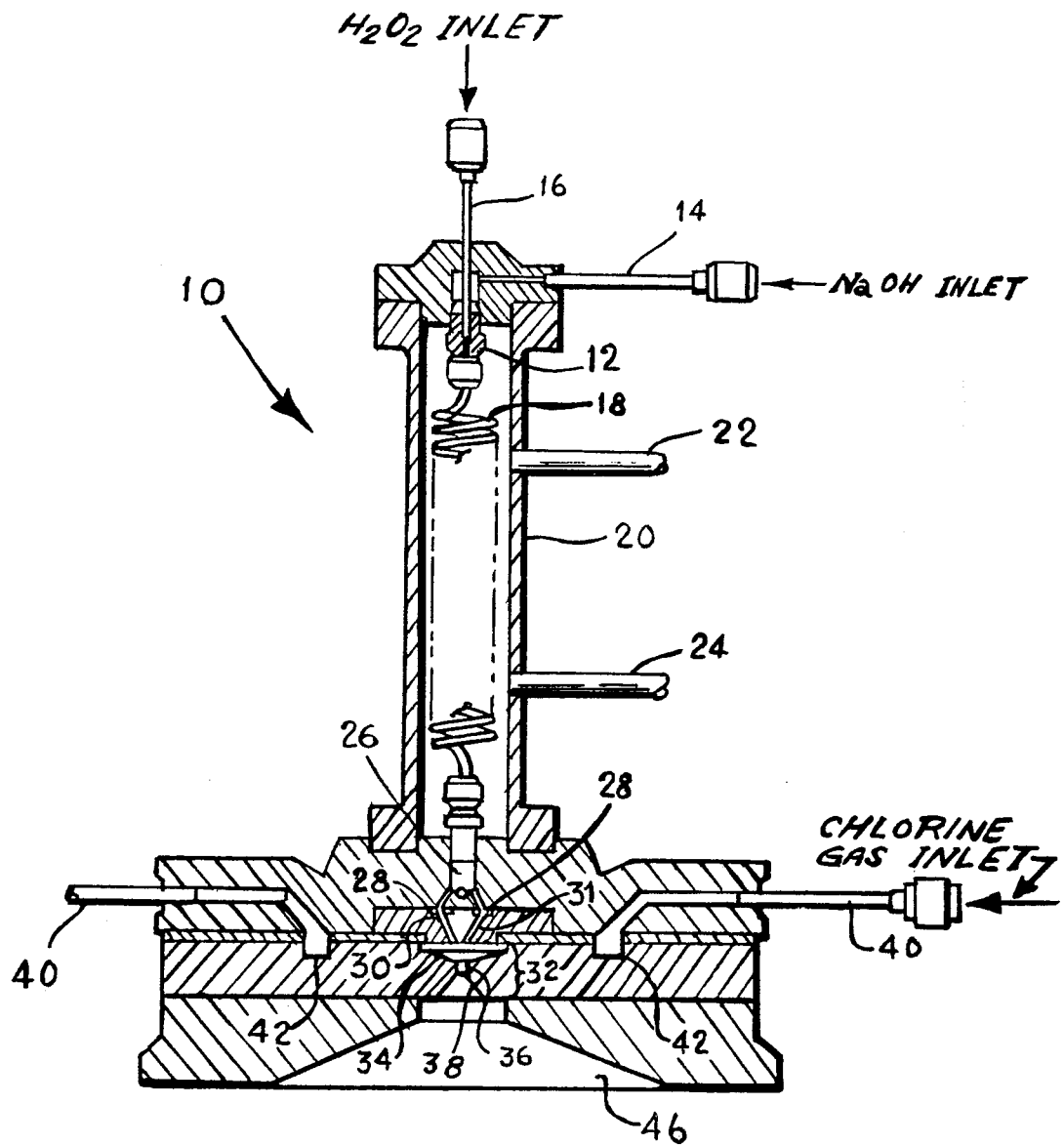
FIG. 1 is a view in cross section of the preferred gas/liquid flow generator of this invention.

Pursuant to the above-defined objects, the present invention concerns itself with a method and apparatus for generating molecular oxygen in the excited singlet-delta electronic state which, in turn, is used as an energizing reactant in a high energy, chemically pumped laser.

In the method and apparatus of this invention, the chemical reactants for generating $O_2(^1\Delta)$, namely, a concentrated sodium hydroxide base and a high strength hydrogen peroxide are mixed in the first mixer portion of the device. In the mixer, the following reaction occurs:

$$H_2O_2 + OH^- \rightarrow OOH^- + H_2O \qquad (I)$$

with the evolution of 5.8 kcal/mole thermal energy. This energy is removed by the heat exchanger portion of the device. The basic peroxide solution is then injected into the device's second mixing chamber, which includes a swirl chamber, in such a manner that droplets are formed. Chlorine gas or liquid chlorine then flows into the second mixing chamber and is absorbed into the droplets. As the two phase mixture passes through the sonic nozzle portion into the low pressure desorber, the shear flow of the accelerating gas phase, and the pressure of absorbed gas causes the droplets to shatter into a very fine spray. This fine spray easily desorbs the excited oxygen formed in reaction (II) very effectively at the low pressure of the desorber (4 to 100 torr) because of its high surface area.

$$OH^- + Cl_2 + 2\,OOH^- \rightarrow 2Cl^- + O_2(^1\Delta) + H_2O) \qquad (II)$$

There are a number of fundamental advantages for this spray type generator concept. First, that the overall reaction stoichiometry of reaction (III), as follows, $$aH_2O_2 + 2MOH + Cl_2 \rightarrow O_2(^1\Delta) + 2MCl + 2H_2O + (a-1)H_2O_2 \qquad (III)$$

is maintained throughout the reaction period; Secondly, the amount of unstable basic peroxide blend is minimized to that volume required to fill the mixer, heat exchanger and injector. Thirdly, a portion of the total heat of reaction is removed in the heat exchanger and a physical means (the injector and sonic orifice) is used to control the passage of reactants so that the unit will operate under a variety of orientations, vibration levels, vectors and gravitational levels. Another advantage is found in the fact that because of the separation of the reaction processes and completeness of the reactions, the ultimate product of reaction can be removed continuously without the need for recirculation.

In the above Equation III, which defines a molar relationship of the reactants, a may vary from 1 to 6, M may be Na (sodium, the preferred embodiment) or K (potassium). Whereas a value of 1 for a would be stoichimetric, a ratio of 2:1 MOH to $Cl_2$ is necessary to preclude the presence of HCl or Cl in the product oxygen, and a ratio of $H_2O_2$:MOH of 1:1 to 3:1 may be desirable to optimize the yield of $O_2(^1\Delta)$.

Various modifications and improvements to this basic apparatus design include an arrangement in which liquid chlorine, rather than gaseous chlorine, is reacted with the basic peroxide in the injector before entering the second mixing chamber. In this embodiment, the swirl chamber may or may not be used. A diluent gas, such as helium, may be admitted in this case through the swirl chamber, if desired. The concentration of the NaOH base may vary from 4 molar to 8 molar, depending on the reaction conditions. Concentration of the hydrogen peroxide may vary from the nominal 90% to 50% or less.

Figure 3:
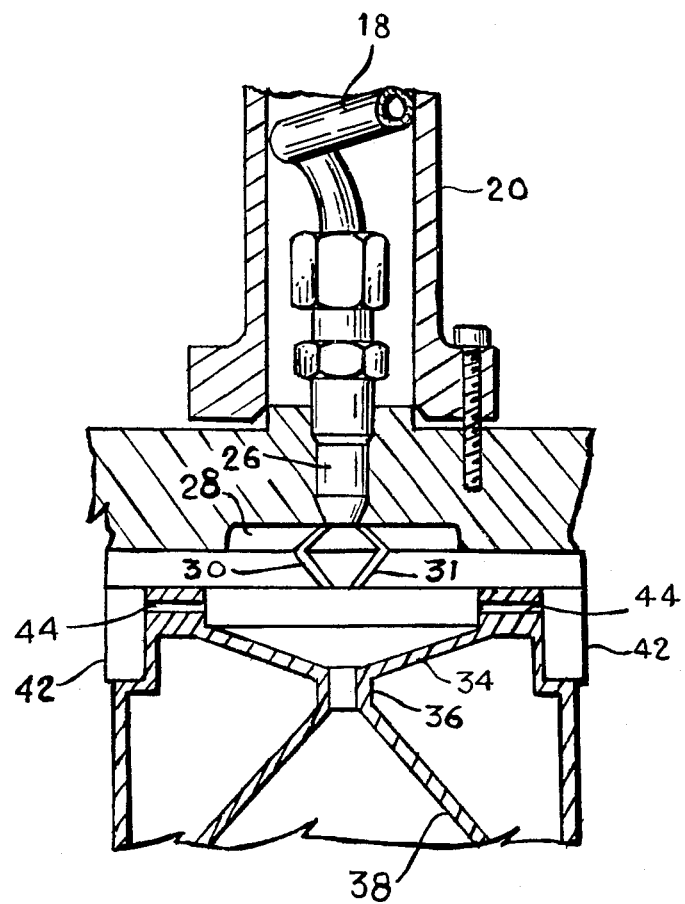
FIG. 3 is an enlarged view of the swirl chamber area of the generators of FIG. 1.

Although the invention is susceptible to various modifiications and alternative constructions, there is shown in FIGS. 1 and 3, a detailed description of the preferred or best known mode of the invention. It is to be understood, however, that the specific description and drawings are not intended to limit the invention to the specific form disclosed. On the contrary, it is intended that the scope of this patent include all modifications and alternative embodiments thereof that fall within the spirit and scope of the invention as expressed in the appended claims to the full range of their equivalents.

With reference now to the preferred embodiment of the apparatus of this invention, as exemplified in FIG. 1 of the drawing, there is shown a singlet delta oxygen generator generally indicated by numeral 10. The generator 10 comprises a first mixing-reacting chamber 12. Inlet means 14 for introducing a flow of sodium hydroxide into chamber 12 and inlet means 16 for introducing a flow of hydrogen peroxide into chamber 12 to effect a reaction between the two components therein. The resulting reaction mixture product is then directed through coils 18, which form part of the heat exchanger 20, in order to remove the heat generated by the $NaOH/H_2O_2$ reaction in chamber 12. Inlets 22 and 24 provide a suitable cooling medium for the exchanger 20. The basic $H_2O_2$ mixer 12 lies upstream from the heat exchanger 20. After flowing through the heat exchanger 20, the basic $H_2O_2$, with heat removed, flows through the injector 26, injector manifold 28 and dual input passageways 30 and 31 into a second reaction chamber generally indicated as 32. This second reaction chamber 32, under vacuum, also includes a swirl cup or chamber 34, a sonic orifice 36 and a low pressure desorber 38 in the form of an expansion cone. The injector passageways 30 and 31 impinge as doublets such that droplets are formed within the swirl chamber 34, the details of, which are more specifically illustrated in FIG. 3. Chlorine gas is admitted through inlet 40 into the chlorine ring manifold 42 and hence into the swirl chamber 34 through tangential slots 44 to develop a swirling flow in the swirl chamber 34. Reaction II occurs in the swirl chamber 34 and the orifice 36. Oxygen then desorbs in the low pressure desorber 38 from the fine droplets generated in the sonic orifice 38. Spent liquid reactants containing dissolved salt, excess hydrogen peroxide, and excess base can be removed by any suitable means, e.g. an ejector, and the product gas can be stripped of water vapor by means of a suitable cold trap, not shown, maintained at a temperature between $-20°$ and $-60°$ C. The heat generated in reaction I is removed by the heat exchanger 20, while the heat generated in reaction II is removed, both as sensible enthalpy in heating the basic peroxide flow and as the heat of vaporization of water. Entrained water droplets are removed by a suitable separator, not shown.

Figure 2:
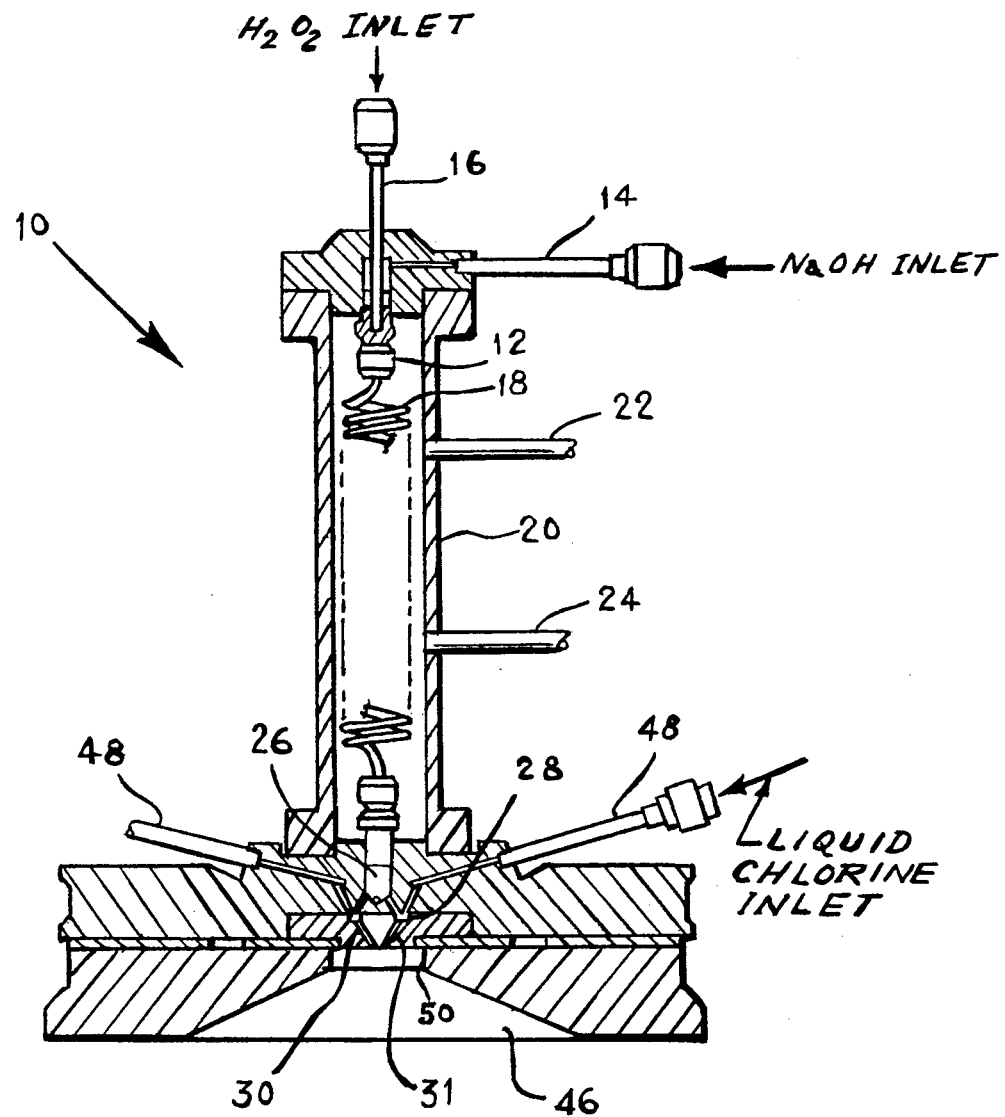
FIG. 2 is a view in cross section of a modification of the generator of FIG. 1 in which the final mixing process is done with liquid chlorine in the injector rather than gaseous chlorine.

Another modification of the invention, which involves the use of liquid chlorine, is shown in FIG. 2. This has the advantage of reducing the heat liberated in reaction II by the amount of the heat of vaporization of the chlorine utilized in that reaction. In this modifications, the chlorine reactant enters through inlet 48 and mixes as a liquid with the flowing basic peroxide at the entrance manifold 28 to the injector passageways 30 and 31. The reaction time is controlled by the length of the injector passageways. The use of the swirl chamber 34 becomes optional at this point and is not required as shown in FIG. 2 where the reaction of the chlorine liquid and the basic $H_2O_2$ solution occurs in the reaction chamber 50 without benefit of a swirl cup 34 or sonic orifice 36.

The $O_2(^1\Delta)$ generators embodied within this invention are designed to supply 0.01 mol/s of products at 0.6–16.6 kPa total pressure at 0°–25° C. The two concepts of this invention are the gas/liquid flow reactor concept of FIG. 1 and the liquid/liquid flow reactor concept of FIG. 2. In the gas/liquid concept, the $H_2O_2$ and NaOH are combined and cooled in the liquid phase and atomized in a doublet which sprays into a swirl cup to approximately 200 kPa pressure of chlorine gas and subsequently to vacuum. In the second liquid/liquid flow concept, the $H_2O_2$ and NaOH are combined and cooled, then combined with liquid chlorine and sprayed directly into the vacuum mixing chamber 50.

The two flow reactor concepts of this invention offer several advantages in that small amounts of sodium hydroxide and hydrogen peroxide are continually being mixed, cooled to remove the heat generated in the reaction/mixing process, combined with chlorine, and injected into a vacuum chamber as very fine droplets to produce an efficient reaction for the production of excited molecular oxygen. The design goal for both these reactors is set forth below:

(a) maximum yield of singlet delta oxygen;
(b) maximum usage of chlorine and peroxide;
(c) minimization of safety risks;
(d) scaling capability; and
(e) minimization of reactor size.

The flow reactors of this invention meet these criteria most effectively.

The inventive approach taken in conceiving the flow reactors of this invention was to isolate the reaction sequences for the production of $O_2(^1\Delta)$. The measured lifetime of $O_2(^1\Delta)$ in an aqueous solution is reported to be on the order of microseconds. Thus, $O_2(^1\Delta)$ must disengage from any liquid phase extremely rapidly. The flow reactors were designed to dissolve the chlorine into the alkaline hydrogen peroxide under high-pressure conditions, with a limited stay time in the reaction chamber of nominally $7.4 \times 10^{-4}$ s at 0° C. An expansion was then made to vacuum in the mixing chamber 32 through the injectors 30 and 31 to atomize the solution and then desorb the generated oxygen in the low pressure desorber 38.

In the reactor part of the generators, optimum absorption and desorption environments are provided by injecting small sodium hydroxide/hydrogen peroxide droplets into a mixing or swirl cup 34 filled with high-pressure gaseous chlorine. Conditions are adjusted to obtain efficient chlorine utilization, which reduces the possibility that chlorine or HCl gas could be a major contaminent of the vapor pohase. Ideally, the smaller gas-generator diameter would be obtained if the gas phase consisted solely of oxygen. However, this is a clearly unatainable situation since the energy from the heat of reaction must be principally dissipated as heat of vaporization to form water vapor, Only if this heat of reaction could be transferred to an external sink could the ideal conditions be approached.

The sequence of mixing of the three reactants follows a distinct pathway: the sodium hydroxide can first be mixed with the $H_2O_2$ in the liquid phase and after removal of the heat of mixing can be reacted with either gaseous or liquid chlorine in the generator. From a safety standpoint, it it desirable to keep the 90% $H_2O_2$ in the unmixed state as long as possible. Thus, the approach selected for this invention is the experimentally established procedure of mixing cold $H_2O_2$ and cold sodium hydroxide solution in the injector and maintaining the resulting solution at low temperature (approximately 10° C.) during its short transit time through the reactor in order to prevent peroxide decomposition from forming $O_2(^3\Sigma)$.

All the reactions in the system are exothermic. If one considers NaOH as the alkali base, then the heat release for reaction IV, illustrated as follows:

$$H_2O_2 + 2NaOH + Cl_2 \rightarrow 2H_2O + 2NaCl + O_2(^1\Delta)$$ 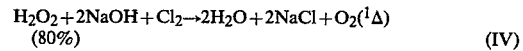
(80%)   (IV)

and assuming 80% of the renumerated $O_2$ is activated, is $-39.3$ kcal/mol for sodium, $-34.2$ kcal/mol for lithium, and $-41.3$ kcal/mol for potassium hydroxide. The heat release for the reaction of chlorine with alkaline peroxide is the heat of reaction of IV less the heat of mixing the alkali and hydrogen peroxide. It should be removed from the system since it serves as the energy source to generate water vapor. The heat release in the reactor can be reduced by removing the heat of mixing the alkali and hydrogen peroxide (or chlorine and alkali) to an external sink.

The gas/liquid flow reactor of FIG. 1 was designed to mix NaOH solution and 90% hydrogen peroxide as it was used and then combine them with gaseous chlorine in a swirl chamber. The use of the flow reactor reduced the quantities of reactant exposed in the cell from 600 cc to about 25 cc and greatly reduced the size of the apparatus. The instability of alkaline hydrogen peroxide solution is well-known. However, the freezing point of hydrogen peroxide/sodium hydroxide solutions was much higher than was originally expected. Therefore, since considerable dilution was inherently necessary, the difficult procedure of mixing crystalline NaOH with 90% hydrogen peroxide was unnecessary and these highly storable constituents could be stored separately.

The coaxial mixer 12 and heat exchanger 20 were designed in such a way that the hydrogen peroxide was injected through inlet 16 into the center of the flowing stream of NaOH solution from inlet 14. The heat release was then made within the metal heat exchanger coil 18 as shown in FIG. 1.

A doublet injector, indicated at 30 and 31, was used to provide a droplet spray in the swirl chamber 34. The doublet holes were sized to 0.025 cm. This is the minimum practical orifice size for teflon used for fabricating the injector passageways 30 and 31. The spray then transverses a 2.54-cm diameter swirl chamber 34 which is fed with chlorine gas from inlet 40. Injection velocity of gas into the swirl chamber is nominally 30.5 m/s through the 0.16-cm$^2$ feed channels 44. The two phase gas/liquid flow was ejected from the swirl mixing chamber or swirl cup 34 through a 0.096-cm sonic orifice 36 sized to provide a swirl chamber pressure of 310.5 kPa. This pressure was selected as a practical maximum based on a minimum working reactor temperature of 0° C. This would result in a maximum possible chlorine vapor pressure of 365.7 kPa. This pressure is far less than the pressure necessary to absorb the total chlorine flow. Calculated droplet size for the impinging doublets is approximately $3.8 \times 10^{-2}$ cm. It is reduced in the orifice to about $3.5 \times 10^{-3}$ cm and then exploded to $1 \times 10^{-4}$ cm in the vacuum chamber swirl 34. Thus, a continuing process of high pressure chlorine absorption, reaction, and low pressure desorption of oxygen from small droplets occurs.

In the liquid/liquid flow reactor of FIG. 2, liquid chlorine is utilized in an apparatus very similar to the type disclosed in FIG. 1. The use of liquid chlorine circumvents the limitations of chlorine solubility in alkaline peroxide solution and dissipation of the heat of solution. The liquid chlorine is injected into the alkaline peroxide flow just at the entrance to the injector doublets 30 and 31 which serve as the mixer for the liquid chlorine from inlet 48 with the previously mixed liquid phase hydrogen peroxide and sodium hydroxide from the exchanger 20. This modification to the reactor of FIG. 1 eliminates the need for a separate chlorine vaporizer. However, the reactor of FIG. 1 is the preferred embodiment.

Flow from the injector doublet 30 and 31 is injected directly into the vacuum chamber 50. No swirl chamber is used so the pressure drop of this chamber is eliminated. This eases the pressure schedule of the reactor, but makes it more sensitive to freezeup during the start transient. Residence time in the doublet is controlled by the channel length to give the required $1 \times 10^{-3}$ s residence time.

The configuration used in FIG. 2 for the mixer 12, exchanger 20 and doublet 30 and 31 is identical to those of the reactor of FIG. 1. In FIG. 2 there is no need to provide vaporized chlorine and liquid chlorine is supplied to the reaction chamber 50 through manifold 28 and injectors 30 and 31.

In testing the generators of this invention, the primary parameters for evaluation of reactor performance was the yield and the conversion efficiency. The yield was defined as the fraction of total oxygen flow which is singlet delta oxygen. The conversion efficiency was originally defined as the fraction of inlet chlorine flow which was converted to singlet delta oxygen. The yield was calculated from the partial pressure of singlet delta oxygen, as indicated by a radiometer calibration, and the partial pressure of oxygen as derived from a mass spectrometer analysis and the total pressure.

The conversion efficiency of chlorine to oxygen is based on singlet delta oxygen rather than total oxygen. The infrared measurement of $O_2(^1\Delta)$ is more accurate than the mass spectrometer measurement of total oxygen and a stable source of $O_2(^1\Delta)$ is desired. The conversion efficiency is referred to chlorine because this gas is the least desirable reactant to be found in the product gases. The incomplete reaction of chlorine results in the necessity of adding more alkali in order to neutralize the chlorine which has not contributed to the desired reaction.

Singlet delta oxygen was generated in the generators. The generators were evaluated on a test system which had been designed for a large scale reactor; an important consequence of this was that the dwell times of the effluent were relatively large for the small flow rates which were used resulting in some quenching of $O_2(^1\Delta)$ prior to the first infrared detector upstream of the reentrant trap and excessive quenching prior to the infrared detector situated downstream of the reentrant trap.

Detailed results and the qualitative behavior of the generators of FIGS. 1 and 2 are presented hereinafter. The liquid/gas flow reactor of FIG. 1 was characterized in a series of experiments intended to prove the feasibility of this type of reactor, explore its characteristics, and study its scaling parameters. A number of design variables were studied and included cryogenic trap conditions, run duration, reagent mixture ratios, system pressure variation effects, $O_2(^1\Delta)$ stability, flow rate through the reactor, and an alternate base study. Several cryogenic trap conditions were used. These included trap coolant variations of $CH_2Cl_2$-dry ice ($-78°$ C.), $CH_2Cl_2$-liquid nitrogen slush ($-95°$ C.), liquid nitrogen ($-190°$ C.), and ambient temperature ($22°$ C.). Inlet and outlet gaseous effluent properties for the trap were measured so that the quenching of singlet delta oxygen in the trap could be measured and compared with theoretical calculations. The results which were obtained upstream of the cryogenic trap are summarized in Table I; the results which were obtained downstream of the cryogenic trap are summarized in Table II. The effect of the cryogenic trap on $O_2(^1\Delta)$ quenching is obvious when results for yields and efficiencies are compared in the two tables.

The feasibility of the liquid/gaseous type flow reactor concept of FIG. 1 was proven in the first two experiments (IIA-1 and IIA-3). Appreciable yields and conversion efficiencies were demonstrated to be possible with low concentrations of HCl and $Cl_2$ in the products, although a large fraction of the gas flow was water vapor which was not removed by the cryogenic trap.

The stability of $O_2(^1\Delta)$ generation is demonstrated by the results achieved during experiment SS-5. After a start at 1.7 kPa system pressure, the system pressure was increased to 8.9 kPa at 228 s. Pressure was then decreased to 2 kPa at 240 s and then increased again to 3.3 kPa s. Pressure was again reduced to about 2 kPa and the device was allowed to run continuously at constant pressure until 1080 s. At this time, the $H_2O_2$ molar flow ratio was changed from $H_2O_2$:NaOH:$Cl_2$=1:1:1 to approximately 1.5:1:1 by increasing $H_2O_2$ flow. At 1260 s, the flow was returned to 1:1:1. A variation in NaOH flow was then made with NaOH and chlorine being reduced to give a mixture ratio of 1.6:1:1 at a lower flow rate of 1.38 g/s as compared with the previous flow of 1.54 g/s. The generator element loading was about 0.005 mol/s for this experiment. Other experiments (SS-4, SS-9, SS-10) demonstrated run durations of up to 1740 s with similar stability and repeatability to SS-5.

TABLE I

SUMMARY OF RESULTS FROM THE LIQUID/GASEOUS TYPE FLOW REACTOR UPSTREAM OF CRYOGENIC TRAP

| Experiment No. and Duration s | $H_2$ Flow Rate mol/s | Reactant Ratio $H_2O_2$/NaOH/$Cl_2$ | System Pressure kPa | Mass Spectrometer Analysis Mole | |
|---|---|---|---|---|---|
| | | | | $O_2$ | $H_2O$ |
| IIA-1 900 | 0.055 | 1:.91:.18 | .76 | 1.5 | 97.9 |
| IIA-3 540 | 0.011 | 1:.45:.065 | 1.8 | 1.4 | 98.5 |
| SS-2 | 0.0055 | 1:.38:1 | 1.2 | 4.7 | 56.5 |
| SS-4 1380 | 0.0048 | 1:.92:1.25 | 1.6 | 0.42 | 28.7 |
| SS-5 1440 | 0.0069 | 1:.61:.81 | 4.2 | 0.89 | 11.1 |
| | 0.0060 | 1:.67:.65 | 2.2 | 17.3 | 17.2 |
| | 0.0047 | 1:.87:.81 | 2.4 | 6.4 | 58.4 |
| | 0.0070 | 1:.49:.54 | 3.3 | 8.7 | 49.2 |
| SS-7 | 0.0049 | 1:.69:.35 | 1.3 | 2.1 | 12.8 |
| SS-9 1740 | 0.027 | 1:.56:.48 | 1.2 | 1.7 | 16.1 |
| | 0.016 | 1:1:.69 | 1.1 | 2.2 | 40.9 |
| SS-10 1740 | 0.0057 | 1:.79:.21 | 1.1 | 5.1 | 11.3 |
| | 0.0052 | 1:.87:.21 | 4.4 | 1.1 | 0.8 |

| Exp. No. and Duration s | Mass Spectrometer Analysis Mole | | | $O_2(^1\Delta)$ Pres. Pa | Efficiency mol/s $O_2(^1\Delta)$ | |
|---|---|---|---|---|---|---|
| | $Cl_2$ | HCl | $N_2$ | | Yield % | mol/s $Cl_2$ % |
| IIA-1 900 | 0 | 0.1 | 0 | 6.7 | 72 | 0.39 |
| IIA-3 540 | 0 | 0 | 0 | 24 | 98 | 96 |
| SS-2 1080 | 3.3 | 5.1 | 36.5 | 53 | 33 | 16.7 |

TABLE I-continued
SUMMARY OF RESULTS FROM THE LIQUID/GASEOUS TYPE FLOW REACTOR UPSTREAM OF CRYOGENIC TRAP

| SS-4  | 6.6 | 16.3 | 48.1 | 222  | 72  | 41   |
|-------|-----|------|------|------|-----|------|
| 1380  | 6.0 | 8.5  | 78.6 | 16.2 | 0.4 | —    |
| SS-5  | 4.9 | 32.7 | 27.9 | 41.2 | 8.8 | 63   |
| 1440  | 2.2 | 24.2 | 8.8  | 57.2 | 48  | 1.9  |
|       | 3.5 | 32.0 | 6.4  | 41.2 | 20  | 0.5  |
| SS-7  | 0   | 0.6  | 84.5 | 61.0 | 66  | 66   |
| 840   |     |      |      |      |     |      |
| SS-9  | 0   | 0    | 82.2 | 116  | 100 | 25.3 |
| 1740  | 0   | 7.5  | 49.5 | 127  | 100 | 22.7 |
| SS-10 | 0   | 0    | 81.7 | 55.6 | 100 | 22.7 |
| 1740  | 0   | 0    | 81.9 | 4.1  | 8.3 | 2.6  |

TABLE II
SUMMARY OF RESULTS FROM THE LIQUID/GASEOUS TYPE FLOW REACTOR DOWNSTREAM OF CRYOGENIC TRAP

| Experiment No. and Duration s | $H_2$ Flow Rate mol/s | Reactant Ratio $H_2O_2$/NaOH/$Cl_2$ | System Pressure kPa | Mass Spectrometer Analysis Mole | |
|---|---|---|---|---|---|
| | | | | $O_2$ | $H_2O$ |
| IIA-1 900 | 0.0055 | 1:.91:.18 | .76 | 1.2 | 88.0 |
| IIA-3 540 | 0.011 | 1:.45:.065 | 1.8 | No Downstream Analysis | |
| SS-2 1080 | 0.0055 | 1:.38:1 | 1.2 | 6.6 | 72.5 |
| SS-4 1380 | 0.0048 | 1:.92:1.25 | 1.6 | 0.52 | 11.9 |
|  | 0.0069 | 1:.61:.81 | 4.2 | 0.91 | 8.6 |
| SS-5 1440 | 0.0060 | 1:.67:.65 | 2.2 | 18.2 | 12.5 |
|  | 0.0047 | 1:.87:.81 | 2.4 | 10.9 | 28.7 |
|  | 0.0070 | 1:.49:.54 | 3.3 | — | — |
| SS-7 840 | 0.0049 | 1:.69:.35 | 1.3 | 1.9 | 20.4 |
| SS-9 1740 | 0.027 | 1:.56:.48 | 1.2 | 1.8 | 14.2 |
|  | 0.016 | 1:1:.69 | 1.1 | 1.0 | 72.6 |
| SS-10 1740 | 0.0057 | 1:.79:.21 | 1.1 | 4.8 | 16.5 |
|  | 0.0052 | 1:.87:.21 | 4.4 | 1.0 | 9.3 |

| Exp. No. and Duration s | Mass Spectrometer Analysis Mole | | | $O_2$ ($^1\Delta$) Pres. Pa | Efficiency mol/s $O_2$ ($^1\Delta$) Yield % | mol/s $Cl_2$ % |
|---|---|---|---|---|---|---|
| | $Cl_2$ | HCl | $N_2$ | | | |
| IIA-1 900 | 0 | 0.1 | 9.9 | 6.7 | 72 | 0.38 |
| IIA-3 540 | No Downstream Analysis | | | | | |
| SS-2 1080 | 4.8 | 15.0 | — | 4 | 4 | 2.7 |
| SS-4 1380 | 8.1 | 20.1 | 59.3 | 16.4 | 7.1 | 4.1 |
|  | 1.0 | 8.7 | 80.7 | 1.1 | 0.05 | — |
| SS-5 1440 | 5.2 | 34.6 | 29.5 | — | — | — |
|  | 3.8 | 41.4 | 15.1 | 1.3 | 1.1 | — |
|  | — | — | — | — | — | — |
| SS-7 840 | 0 | 0.52 | 77.2 | 13.7 | 5.9 | 5.9 |
| SS-9 1740 | 0 | 0 | 84.0 | 5.0 | 22.9 | 1.1 |
|  | 0 | 3.5 | 23.0 | 3.3 | 13.7 | 0.7 |
| SS-10 1740 | 0 | 0 | 76.9 | 21.7 | 41.4 | 7.6 |
|  | 0 | 0 | 74.8 | 0.9 | 2.1 | — |

Studies were also done to define the most favorable mixture ratios. Table III retabulates the run data in terms of various reagent mixture ratios, yields and efficiencies. The data indicate that a 2:1 ratio of NaOH/$Cl_2$ is needed to eliminate $Cl_2$ and HCl from the products. In Table III, it appears that the conversion of $H_2O_2$ to $O_2$ and $O_2$* is maximized as $Cl_2$/$H_2O_2$ exceeds 1. Therefore, target mixture ratios for the production of $Cl_2$ and HCl free products should be approximately 1:2:1.

Run SS-10 investigated the use of KOH as the base. KOH has the advantage that is apparently is much more soluble than NaOH in $H_2O_2$/$H_2O$ solutions. To test this, an 8N solution of KOH in water was used in run SS-10. To maximize the solubility, the run was made at 22° C. Since the run demonstrated a yield of near 100% and a conversion to singlet delta oxygen of 39%, it would appear that the use of KOH as an alternate at 8N is feasible.

A second study in ss-10 was a study of the effect of $CO_2$ on the quenching of $O_2(^1\Delta)$. In the first portion of the run, a nitrogen flow was used to vary run pressure, yielding the data which appears to indicate that a quenching effect does occur with $CO_2$, but that at short dwell time, it is inconsequential.

Experiment SS-9 was done to demonstrate the effect of high throughput on conversion and yield. In this run, a flow somewhat in excess of the nominal design point was put through the reactor. Yield remained near 100%, but efficiency dropped to near 25%. Thus, it appears that the flow rate through the reactor is much more satisfactory at 0.005 mol/s than at 0.01 mol/s. It would appear that efficiencies are maximum at a total molar flow of 0.016 mol/s per element, while yield will be maximum at molar flows greater than 0.016 mol/s per element.

The conclusion to be gained from these test results indicates that the liquid/gaseous, swirl chamber, flow reactor of FIG. 1 is a very desirable apparatus and method for the production of singlet delta oxygen. In this type of reactor, chlorine and HCl can be eliminated from the product gas by increasing the NaOH/$Cl_2$ ratio to 2. Yields to 90% or greater are possible and conversion efficiencies or greater than 60% are also possible. The partial pressure of oxygen is reproducible and stable. There is a relationship between dwell time in the generator and downstream yield. Yield will be maximized at minimum dwell time. A run duration as high as 29 minutes was demonstrated and it was found that singlet delta oxygen could be produced at system pressures up to 9.3 kPa.

The liquid/liquid flow reactor of FIG. 2, which makes a direct injection of mixed liquid reactants into the vacuum mixing chamber 50 of the generator, was tested in a single experiment. The resulting data is summarized in Table IV. From this data it may be inferred that this apparatus is a feasible device for the production of significant amounts of singlet delta oxygen. The efficiency and yield of this device, however, are not nearly as desirable as those of the liquid/gaseous apparatus of FIG. 1.

The operational characteristics of the liquid/liquid reactor of FIG. 2 are quite similar to those of the FIG. 1 apparatus with the exception that the liquid/liquid reactor is much less stable. The sonic orifice of the swirl cup in the liquid/gaseous reactor seems to isolate the feed system from pressure fluctuations. The reactor of FIG. 2 has the advantage that it uses liquid chlorine so that the heat of solution is significantly smaller than in the FIG. 1 reactor. This should result in less water being vaporized in the generator. A comparison of the advantages and disadvantages of the two types of reactors is shown in Table V.

TABLE III
SUMMARY OF REAGENT MIXTURE RATIOS, $O_2$ ($^1\Delta$) YIELDS AND EFFICIENCIES FOR THE LIQUID/GASEOUS FLOW REACTOR EXPERIMENTS

| Experiment No. | $H_2O_2$ Flow mol/s | Reactant Ratios | | |
|---|---|---|---|---|
| | | $H_2O_2$/NaOH/$Cl_2$ | NaOH/$Cl_2$ | $H_2O_2$/$Cl_2$ |

TABLE III-continued
SUMMARY OF REAGENT MIXTURE RATIOS, $O_2(^1\Delta)$ YIELDS AND EFFICIENCIES FOR THE LIQUID/GASEOUS FLOW REACTOR EXPERIMENTS

| IIA-1 | 0.0055 | 1/0.91/0.18 | 5.06 | 5.6 |
|---|---|---|---|---|
| IIA-3 | 0.011 | 1/0.45/0.065 | 6.92 | 15.38 |
| SS-2 | 0.0055 | 1/0.38/1 | 0.38 | 1 |
| SS-4 | 0.0048 | 1/0.92/1.25 | 0.74 | 0.80 |
|  | 0.0069 | 1/0.61/0.81 | 0.75 | 1.23 |
| SS-5 | 0.0060 | 1/0.67/0.65 | 1.03 | 1.54 |
|  | 0.0047 | 1/0.87/0.81 | 1.07 | 1.23 |
|  | 0.0070 | 1/0.49/0.54 | 0.91 | 1.85 |
| SS-7 | 0.0049 | 1/0.69/0.35 | 1.97 | 2.86 |
| SS-9 | 0.027 | 1/0.55/0.48 | 1.17 | 1.08 |
|  | 0.016 | 1/1/0.69 | 1.45 | 1.45 |
|  |  |  | $KOH/Cl_2$ |  |
| SS-10 | 0.0057 | 1/0.79/0.21 | 3.76 | 4.76 |
|  | 0.0052 | 1/0.87/0.21 | 4.14 | 4.76 |

| Exp. No. | Reactor Yield Data Conversions | | | | Yield $O_2^*/O_2$ | System Pres. kPa |
|---|---|---|---|---|---|---|
|  | $O_2^*/Cl_2$ | $O_2/Cl_2$ | $O_2/H_2O_2$ | $O_2^*/H_2O_2$ |  |  |
| IIA-1 | 0.0039 | 0.0054 | 0.00097 | 0.00069 | 0.72 | 0.76 |
| IIA-3 | 0.96 | 0.98 | 0.06 | 0.06 | 0.98 | 1.8 |
| SS-2 | 0.17 | 0.51 | 0.51 | 0.17 | 0.33 | 1.2 |
| SS-4 | 0.41 | 0.57 | 0.71 | 0.51 | 0.72 | 1.6 |
|  | — | — | — | — | 0.04 | 4.2 |
| SS-5 | 0.088 | 1 | 0.65 | 0.06 | 0.09 | 2.2 |
|  | 0.02 | 0.04 | 0.03 | 0.01 | 0.48 | 2.4 |
|  | 0.005 | 0.025 | 0.01 | .002 | 0.20 | 3.3 |
| SS-7 | 0.66 | 1 | 0.35 | .23 | 0.66 | 1.3 |
| SS-9 | 0.25 | 0.25 | 0.12 | 0.12 | 1.00 | 1.2 |
|  | 0.23 | 0.23 | 0.16 | 0.16 | 1.00 | 1.1 |
| SS-10 | 0.39 | 0.39 | 0.08 | 0.08 | 1.00 | 1.1 |
|  | 0.07 | 0.89 | 0.19 | 0.02 | 0.08 | 4.4 |

TABLE IV
SUMMARY OF RESULTS FROM LIQUID/LIQUID TYPE REACTOR

| Experiment No. and Duration s | $H_2O_2$ Flow Rate mol/s | Reactant Ratios $H_2O_2$: NaOH:$Cl_2$ | System Pressure kPa | Mass Spectrometer Analysis Upstrm. of Cryogenic Trap, mole % | |
|---|---|---|---|---|---|
|  |  |  |  | $O_2$ | $H_2O$ |
| IIB-1 720 | 0.0069 | 1:0.78:3.2 | 0.93 | 4.0 | 66.8 |
|  |  |  |  | Mass Spectrometer Analysis Dnstrm. of Cryogenic Trap mole % | |
| IIB-1 720 | 0.0069 | 1:0.78:3/2 | 0.93 | 6.3 | 47.9 |

| Experiment No. and Duration | Mass Spectrometer Analysis of Cryogenic Trap, mole % | | | Upstrm. $O_2(^1\Delta)$ Pres. Pa | Efficiency mol/s $O_2(^1\Delta)$ | |
|---|---|---|---|---|---|---|
|  | $Cl_2$ | HCl | $N_2$ |  | Yield % | mol/s $Cl_2$ % |
| IIB-1 720 | 0 | 0.15 | 29 | 4.5 | 12 | 2.6 |
|  | Mass Spectrometer Analysis Dnstrm. of Cryogenic Trap, mole % | | | | | |
| IIB-1 720 | 0 | 0.24 | 45.6 | 0.75 | 1.3 | 0.42 |

TABLE V
COMPARISON OF REACTOR CONCEPTS

| Type | Description | Advantages | Disadvantages |
|---|---|---|---|
| Liquid/ gaseous | Swirl Chamber | Constant output Minimum Reactant Scaleable Stable Minimum Size Good Yield | High freezing point Gaseous $Cl_2$ |
| Liquid/ liquid | Internal mix | Constant Output Liquid chlorine used Scaleable Minimum Size | Moderate Yield High freezing point Less stable than liquid/gaseous concept. |

While the present invention has been described with particularity in reference to a specific embodiment thereof, it is to be understood that the disclosure of the present invention is for the purpose of illustration only and is not intended to limit the invention in any way, the scope of which is defined by the appended claim:

What is claimed is:

1. A method for preparing molecular oxygen in the excited singlet delta electronic state for use as an energizing reactant for chemical lasers which comprises the steps of:
   (a) introducing a flow of hydrogen peroxide and sodium hydroxide reactants into a flowing reactor;
   (b) mixing the said reactants at a pressure greater than one atmosphere to effect a reaction therebetween and form an intermediate reaction product, and cooling and removing the heat from said reaction at said pressure;
   (c) passing said intermediate reaction product through a sonic orifice and swirling chamber to form a swirling droplet spray of said intermediate reaction product while simultaneously introducting chlorine into said swirling droplet spray to effect a reaction therebetween and produce excited molecular oxygen;
   (d) desorbing said excited molecular oxygen in a vacuum chamber downstream of the said sonic orifice and swirling chamber;
   (e) removing any entrained liquid water droplets and water vapor from said excited molecular oxygen; and
   (f) removing and storing the resulting excited molecular oxygen.

2. A method in accordance with claim 1 in which said excited oxygen is provided in the amount of about 1 to 10 torr with a singlet delta oxygen content greater than 30%.

3. A method in accordance with claim 1 in which the molar ratios of the $H_2O_2$:NaOH:$Cl_2$ reactants range from about 1:2:1 to 6:2:1.

4. A method in accordance with claim 1 wherein the percentage concentration of the hydrogen peroxide is in the range of from about 50 to 90 percent and the molar concentration of the sodium hydroxide is in the range of from about 4 to 8.

* * * * *